S. Warner,
Drag Saw.
N° 42,034. Patented Mar. 22, 1864.
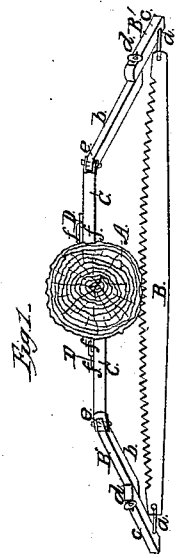
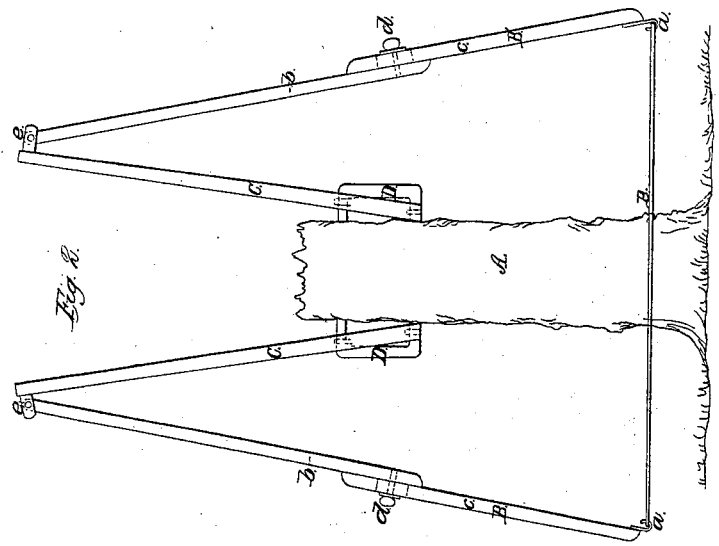
Witnesses: Inventor:
Sheldon Warner.

UNITED STATES PATENT OFFICE.

SHELDON WARNER, OF ENFIELD, MASSACHUSETTS.

IMPROVEMENT IN SAWS FOR FELLING TREES.

Specification forming part of Letters Patent No. 42,034, dated March 22, 1864.

*To all whom it may concern:*

Be it known that I, SHELDON WARNER, a resident of Enfield, in the county of Hampshire and State of Massachusetts, have invented a new and useful Mechanism to be Used in Felling a Tree; and I do hereby declare the same to be fully described in the following specification and represented in the accompanying drawings, of which—

Figure 1 denotes a top view; Fig. 2 an e'evation of the said mechanism as applied to a saw and the trunk of a tree.

The object of my invention is to support a saw and allow the same to be moved in manner and so as to saw into and through the trunk of a tree while in an erect position.

In the drawings, A denotes the trunk of a tree, and B a saw, the latter being arranged horizontally and with its teeth against the said trunk in a standing position. The two extremities of the saw are supported by hooks *a a*, projecting from the hangers B' B'. Each of the hangers is composed of two bars *b c*, lapped on one another, and connected by a clamp-screw, *d*, which goes through an elongated slot in the bar *c*, and screws into the bar *b*. By such application of the two bars the length of the hanger may be increased or diminished a little in order to properly adapt the hanger to the saw. Each of the hangers B' B' is supported from the upper end of one of two inclined struts, C C, and by means of a joint-connection, *e*, such as will allow the hanger to swing both toward and from the strut, as well as laterally with respect to it, the same being to enable the saw not only to be moved longitudinally with respect to itself, but to work laterally through the trunk of a tree. Furthermore, each of the struts C C is applied to the tree by means of one of two staples or dogs, D D, which are driven into the tree on opposite sides of it, are connected with the struts by clamps *f f*, driven or otherwise fixed in them and so as to overlap the legs of the staples. By means of the said dogs the struts and the hangers, constructed and applied together and to the tree, and substantially as described, the said saw may be supported against a tree, and by taking hold of the hangers two men can move the saw so as to cause it to cut through the trunk of a tree.

What I claim as my invention is—

The combination of the dogs D D, the struts C C, and the hangers B' B', as arranged and to be applied together and to a saw and a tree, substantially as and for the purpose as specified.

SHELDON WARNER.

Witnesses:
R. H. EDDY,
F. P. HALE, Jr.